June 9, 1942.   T. A. MEYER   2,285,741
DEVICE FOR MEASURING CONICAL ARTICLES
Filed May 28, 1941

Inventor
Theodore A. Meyer
Attorney

Patented June 9, 1942

2,285,741

UNITED STATES PATENT OFFICE 2,285,741

DEVICE FOR MEASURING CONICAL ARTICLES

Theodore A. Meyer, Indianapolis, Ind.

Application May 28, 1941, Serial No. 395,640

7 Claims. (Cl. 33—174)

This invention relates to a device for measuring the taper per foot of conical or frusto-conical shaped elements.

Elements of conical or frusto-conical shape are used extensively in mechanisms of various kinds and it is essential that the taper of the male and female elements be exactly the same, otherwise the virtue of the conical relation is lost, therefore it is necessary and is also common practice to employ gages for checking the taper of all such elements.

Heretofore devices used for measuring the taper per foot of such elements have been of the sine bar type, which required the use of a different height of gage in connection therewith for each and every different element measured and the determination of the taper of each different element necessitated a laborious mathematical computation.

Such computations not only require a high degree of skill, which is not possessed by the average mechanic, but also require considerable time and effort. Furthermore, these devices are of such a character that it is very difficult to position and hold the element being measured in the correct relative position in the device, which is absolutely necessary to insure accurate results.

The primary object of the invention is to provide a device of such a character that the taper of a cone may be determined thereby without mathematical computation.

A further object of the invention is to provide a device embodying the inherent virtues of both the V-block and the sine bar, by means of which the taper of a conical or frusto-conical element may be accurately determined.

A further object of the invention is to provide such a device with which the taper per foot of any cone within the range of the device, will be indicated by a gage associated therewith.

A further object of the invention is to provide a device of such a character, that when a conical element is placed thereon it will automatically find and maintain the proper position relative thereto.

A further object of the invention is to provide a device having the inherent characteristic, that when the end thereof, adjacent to the small end of the conical element being measured, is elevated until the top surface of the element is in perfect parallelism with the base, the amount of elevation will be exactly equal to the taper per foot of the element.

Other objects of the invention may appear as the device is described in detail.

Figure 1:
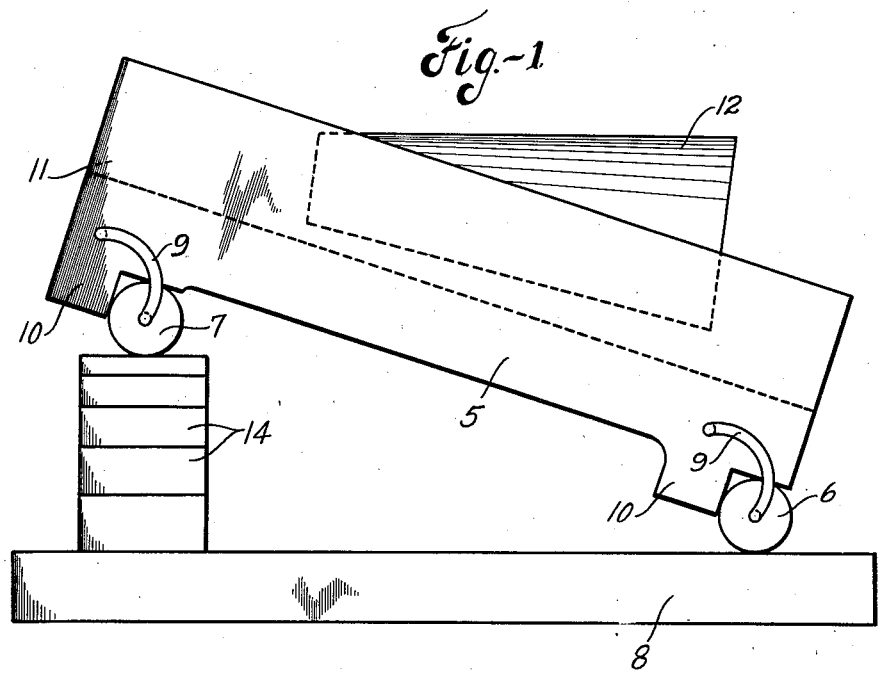
Figure 2:
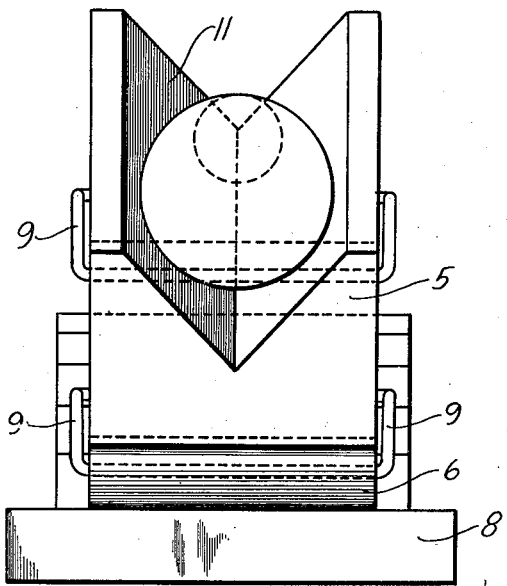

In the accompanying drawing Fig. 1 is a side elevation of a device embodying my invention, showing the same in operative position; and Fig. 2 is an end elevation of such a device.

In the drawing I have illustrated one embodiment of the invention but it will be understood that the device may take various forms without departing from the spirit of the invention. I also wish it to be understood that the word "cone" as herein used is intended to include elements of either conical or frusto-conical shape or of any shape having a taper which can be measured by a device embodying the invention. While the taper of the cone is herein referred to as the taper per foot it will be obvious that the taper may be based upon the meter or other unit of linear measurement.

The device comprises a structure having means for supporting the same on a plane surface at points spaced a predetermined distance one from the other, and also having means for supporting a cone thereon in such predetermined relation thereto that when said structure is tilted about one of said points of support to position the top of said cone in parallelism with said plane surface the extent of tilting movement of said structure will indicate the taper per foot of said cone.

In the embodiment here illustrated the device comprises an elongate structure 5, the upper and lower portions of which may be formed in a single piece, as here shown, or may be formed separately and secured in fixed relation one to the other. The lower portion of this tructure is somewhat similar to a device, known as the sine bar, heretofore used in certain measuring operations. This lower portion or sine bar is provided with suitable supporting members 6 and 7 arranged in fixed relation thereto and spaced one from the other an exact predetermined distance. The supporting members may take any suitable form and may be retained in fixed relation to the structure in any suitable manner. Preferably they are curved on equal radii about axes transverse to the structure to provide the same with narrow contact surfaces adapted to have supporting contact with a plane surface, such as the top surface of a base 8, so that the structure may be tilted about the point of contact of one of these supporting members with the plane surface. In the present instance the supporting members are cylindrical in form and are connected with the lower portion of the structure by springs 9 which hold the same normally in predetermined positions with relation to the structure, and the distance between the supporting members is measured from the axes thereof. Inasmuch as the points of contact between the supporting members and the plane surface are in the vertical plane of the axes of the respective members it will be obvious that the distance between the points of contact will be the same as the distance between the axes of the cylindrical members. To accurately position these supporting members with relation to the structure the latter is provided with downwardly extending projections 10 which form two-sided recesses, facing in the same direction, and the supporting members are retained by the springs 9 in normal contact with both walls of the respective recesses. The rotatability of the supporting members enables them to be adjusted to bring truly concentric portions of the surface thereof into contact position in the event one or more portions of said surfaces should become slightly worn. The supporting members may be spaced apart any suitable distance. This distance forms the basis on which the relation of certain parts of the device one to the other must be computed, and in order to provide a convenient figure for such computations I prefer to space the axes of cylindrical supporting members exactly ten inches one from the other.

The upper portion of the structure 5 is provided with a longitudinal V-shaped groove 11 adapted to receive the cone 12 which is to be measured and the apex of this V-groove is in a vertical plane exactly parallel with the lower portion or sine bar of the structure, so that the longitudinal axis of a cone placed in said V-groove will also be in true parallelism with the sine bar, and will be automatically located in that position by merely placing the same within the groove. The angle of this V-groove must bear a definite relation to the distance between the axes of the supporting members.

In measuring the cone the latter is placed in the V-groove and that end of the structure adjacent the smaller end of the cone is elevated to a position in which the top surface of the cone is in true parallelism with the plane surface on which the structure rests. When the angle of the V-groove bears the proper relation to the distance between the axes of the supporting members the distance between the plane surface and the contact surface of the supporting member at the elevated end of the structure will equal the taper per foot of the cone. The angle of the V-groove necessary to this result is determined by mathematical computation and when once determined, in connection with a given cone, remains constant for all cones, within the range of operation of the device, the taper of which are between zero and the angle of the V-groove. The angle of the groove will, of course, vary with the variations in the distance between the axes of the supporting members and in the present instance, where these axes are spaced exactly ten inches apart, the angle of the V-groove will be slightly less than a right angle, and where the V-groove is an exact right angle the space between the axes will be somewhat more than ten inches.

Any suitable means may be provided for supporting that end of the structure adjacent the smaller end of the cone in a position in which the top of the cone will be parallel with the plane surface and for determining the distance between the supporting member at the elevated end of the structure and the plane surface. Preferably a variable height gage is used for this purpose and in the arrangement illustrated I have shown a stack of Johannsen blocks 14 supported on the plane surface and on the top block of which the supporting member at the elevated end of the structure is supported. The Johannsen blocks provide a convenient gage for this purpose as blocks may be readily inserted in and removed from the stack to properly position the structure 5 and provide a very exact measurement of the distance between the supporting member and the plane surface.

When the proper relation between the angle of the V-groove and the distance between the supporting members has been determined in connection with one cone and the device constructed in accordance with that determination any cone within the range of operation of the device can be quickly and easily measured thereon without computation. When the device is used to determine the taper per foot of a cone in the course of construction, the one end of the structure 5 is elevated and supported on a gage the effective height of which is equal to the desired taper per foot of the cone. As the cone approaches completion it is from time to time placed in the groove of the device and when the top surface of the cone is in true parallelism with the plane surface of the base that cone has the desired taper per foot. When it is desired to determine the taper of a previously formed cone the latter is placed in the groove and that end of the structure adjacent the small end of the cone is elevated, on a gage, until the top surface of the cone is in true parallelism with the surface of the base and the effective height of the gage, between the elevated supporting member and the plane surface, will be the taper per foot of the cone.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a cone measuring device, an elongate structure, supporting members for said structure having narrow contact surfaces to pivotally engage a plane surface, said contact surfaces being spaced longitudinally of said structure a predetermined distance one from the other, said structure having in its upper portion a longitudinal V-shaped groove to receive the cone to be measured, the angle of said groove bearing such relation to the distance between the contact surfaces of said supporting members that when that end of said structure adjacent the smaller end of said cone is elevated with relation to the other end thereof to position the top of said cone in true parallelism with said plane surface the distance between the contact surface of the supporting member at the elevated end of said structure and said plane surface will be equal to the taper per foot of said cone.

2. In a cone measuring device, an elongate structure, supporting members for said structure adapted to have supporting contact with a plane surface, the contact surfaces of the respective members being described about transverse axes spaced a predetermined distance one from the other, said structure having in its upper portion a longitudinal V-groove to receive the cone to be measured, the angle of said groove bearing such relation to the distance between the axes of said supporting members that when that end of said structure adjacent the smaller end of said cone is elevated with relation to the other end thereof to position the top of said cone in true parallelism with said plane surface the distance between the supporting member at the elevated end of said structure and said plane surface will be equal to the taper per foot of said cone.

3. In a cone measuring device, a structure having a lower portion provided with longitudinally spaced recesses, cylindrical supporting members mounted in the respective recesses to support said structure on a plane surface and having their axes spaced a predetermined distance one from the other, said structure having an upper portion provided with a longitudinal V-groove to receive the cone to be measured, the angle of said groove bearing such relation to the distance between the axes of said cylindrical members that when that end of said structure adjacent the smaller end of said cone is elevated with relation to the other end thereof to position the top of said cone in true parallelism with the plane surface the distance between said plane surface and the cylindrical member at the elevated end of said structure will equal the taper per foot of said cone.

4. In a cone measuring device, an elongate structure, supporting members for said structure adapted to have supporting contact with a plane surface, the contact surfaces of the respective members being described about transverse axes spaced a predetermined distance one from the other, said structure having in its upper portion a longitudinal V-groove to receive the cone to be measured, and having its apex in a vertical plane parallel with the lower portion of said structure, the angle of said groove bearing such relation to the distance between the axes of said supporting members that when that end of said structure adjacent the smaller end of said cone is elevated with relation to the other end thereof to position the top of said cone in true parallelism with said plane surface the distance between said plane surface and the supporting member at the elevated end of said structure will equal the taper per foot of said cone.

5. In a cone measuring device, an elongate structure having upper and lower portions in fixed relation one to the other, said upper portion being provided with a longitudinal V-shaped groove to receive the cone to be measured and having its apex in a vertical plane parallel with said lower portion, supporting members connected with the lower portion of said structure and maintained normally in fixed positions with relation thereto, one of said supporting members being adapted to support said structure on a base having a plane surface for movement about a transverse axis, the other of said members being adapted to be supported on a gage of variable height resting on said plane surface, said supporting members being spaced one from the other a distance so related to the angle of said V-shaped groove that when the top surface of a cone in said groove is parallel with said plane surface the effective height of said gage will equal the taper per foot of said cone.

6. In a cone measuring device, an elongate structure having upper and lower portions in fixed relation one to the other, said upper portion being provided with a longitudinal V-shaped groove to receive the cone to be measured and having its apex in a vertical plane parallel with said lower portion, and means for supporting said structure on a base having a plane surface and comprising parts connected with said structure and having contact surfaces to engage respectively said plane surface and the uppermost block of a stack of gage blocks supported on said plane surface, said contact surfaces being curved about transverse axes spaced one from the other a distance so related to the angle of said V-shaped groove that when the top surface of a cone in said groove is parallel with said plane surface the height of said stack of gage blocks will equal the taper per foot of said cone.

7. In a device for measuring tapered elements, a structure having in the upper portion thereof an elongate V-shaped groove to receive the element to be measured, and means comprising parts curved about transverse axes on radii of equal length for supporting said structure on a plane surface and on a variable height gage supported on said plane surface.

THEODORE A. MEYER.